United States Patent
Ambrosio

(10) Patent No.: US 9,843,078 B2
(45) Date of Patent: Dec. 12, 2017

(54) UNITIZED ENERGY STORAGE SYSTEM ENCLOSURE

(71) Applicant: DG Systems LLC, Smithtown, NY (US)

(72) Inventor: Joseph Mario Ambrosio, Smithtown, NY (US)

(73) Assignee: DG Systems, LLC, Smithtown, NY (US)

( * ) Notice: Subject to any disclaimer, the term of this patent is extended or adjusted under 35 U.S.C. 154(b) by 160 days.

(21) Appl. No.: 14/620,436

(22) Filed: Feb. 12, 2015

(65) Prior Publication Data
US 2015/0236311 A1    Aug. 20, 2015

Related U.S. Application Data

(60) Provisional application No. 61/941,381, filed on Feb. 18, 2014.

(51) Int. Cl.

| | | |
|---|---|---|
| *H01M 2/10* | (2006.01) | |
| *H01M 10/63* | (2014.01) | |
| *H01G 11/78* | (2013.01) | |
| *H01G 11/84* | (2013.01) | |
| *H01M 10/625* | (2014.01) | |
| *H01G 2/08* | (2006.01) | |
| *H01M 10/613* | (2014.01) | |
| *H01G 11/18* | (2013.01) | |
| *H01M 10/6557* | (2014.01) | |
| *H01M 10/643* | (2014.01) | |
| *H01M 10/6561* | (2014.01) | |
| *H01M 10/6567* | (2014.01) | |
| *H01M 10/6555* | (2014.01) | |

(52) U.S. Cl.
CPC ........... *H01M 10/625* (2015.04); *H01G 2/08* (2013.01); *H01G 11/18* (2013.01); *H01G 11/78* (2013.01); *H01G 11/84* (2013.01); *H01M 2/1077* (2013.01); *H01M 10/613* (2015.04); *H01M 10/643* (2015.04); *H01M 10/6557* (2015.04); *H01M 10/6555* (2015.04); *H01M 10/6561* (2015.04); *H01M 10/6567* (2015.04); *H01M 2220/20* (2013.01); *Y02E 60/13* (2013.01); *Y10T 29/49108* (2015.01)

(58) Field of Classification Search
CPC .... H01M 2/10; H01M 2/1027; H01M 10/613; H01M 10/625; H01M 10/63; H01M 10/6561; H01M 10/6567

See application file for complete search history.

(56) References Cited

U.S. PATENT DOCUMENTS

| | | |
|---|---|---|
| 6,559,657 B1 | 7/2003 | Pollett et al. |
| 7,427,156 B2 | 9/2008 | Ambrosio et al. |

(Continued)

*Primary Examiner* — Karie O'Neill Apicella
(74) *Attorney, Agent, or Firm* — Collard & Roe, P.C.

(57) ABSTRACT

A thermally managed electrical energy storage device enclosure includes a monocoque body formed from a plastic material using a single batch process and at least one void defined by a circumferential inner wall of the monocoque body. The void is adapted to receive at least one electrical energy storage device with a compression interference fit between an entire outer circumferential surface of the electrical energy storage device and the circumferential inner wall. The circumferential inner wall exerts a uniform radial force on the electrical energy storage device received therein.

19 Claims, 4 Drawing Sheets

(56) References Cited

U.S. PATENT DOCUMENTS

| | | |
|---|---|---|
| 8,115,450 B2 | 2/2012 | Ambrosio et al. |
| 8,877,112 B2 | 11/2014 | Bonassar et al. |
| 2008/0093140 A1 | 4/2008 | Asai et al. |
| 2009/0183936 A1 | 7/2009 | Kim et al. |
| 2013/0196184 A1 | 8/2013 | Faass et al. |
| 2015/0214519 A1* | 7/2015 | Ringer ............... H01M 2/1027 429/156 |
| 2015/0221914 A1* | 8/2015 | Page ................. H01M 2/1016 429/82 |

* cited by examiner

UNITIZED ENERGY STORAGE SYSTEM ENCLOSURE

CROSS REFERENCE TO RELATED APPLICATIONS

This application is the non-provisional application of and claims the benefit under 35 USC §119(e) of U.S. Provisional Application Ser. No. 61/941,381 filed on Feb. 18, 2014, the disclosure of which is hereby incorporated by reference.

BACKGROUND OF THE INVENTION

1. Field of the Invention

The present invention relates to relates to thermally managed electrical energy storage device enclosures and self-managing thermal enclosures.

2. The Prior Art

With the increased market penetration of all-electric and hybrid electric vehicles, a variety of new electrical energy storage devices are being developed and deployed in the vehicle industry.

Such electrical energy storage devices include, for example electrochemical electrical energy storage devices (such as, for example, batteries or cells) and capacitive-type energy storage devices (such as, for example, ultracapacitors).

Although many of these electrical energy storage devices offer improved performance (resulting in longer life and vehicle range), they still suffer from thermal management challenges. In many cases these challenges are amplified by increased energy requirements and increased power density.

Based on the electrical losses of any electrical circuit (specifically "IR" or current and resistance loses), the electrical energy storage system is subject to a high degree of current density (amps per area $w/m^2$) and therefore heating. Heating causes a number of problems for any electrical energy storage device. In particular, heating causes the following three problems in electrical energy storage devices:

(1) thermal cycling which causes dimensional instability (swelling) and results in degradation of the electrical energy storage device enclosure and an increase of the internal electrical conductive paths of the electrical energy storage device, which further increases the internal resistance (and heating) and results in a lower operating voltage;

(2) chemical breakdown of the internal electrical energy storage device structure from elevated temperatures; and (3) thermal runaway (uncontrolled heating).

Electrical energy storage device usage patterns, especially for large demand applications such as for electric vehicles, generate significant heat during rapid charge and discharge cycles. At such points current levels may exceed the device's rating, generating even more heat.

From a practical perspective, as electrical energy storage device size increases, the ratio of heat/cooling surface area to power generating volume typically decreases. Thus, as variations in charge or discharge current increases, so does the subsequent amount of generated heat. As a result, the temperature of the electrical energy storage device rises dramatically.

The availability of discharge power, available energy, and sometimes even charge acceptance are all influenced by electrical energy storage device temperature affects. Ideally, electrical energy storage devices will operate in a temperature range that optimizes electrical energy storage device performance and life. However, practically speaking, even temperature variation between modules in a pack of electrical energy storage devices causes differences in the performance of each module leading to an unbalanced pack and reduced pack performance.

Electrical energy storage device thermal management systems seek to minimize temperature variation between electrical energy storage devices and to keep the electrical energy storage devices closer to the ideal operating temperature range. Thermal management designs are best if they are lightweight and compact.

Prior art thermal management systems for electrical energy storage devices typically make use of air, liquids, insulation, thermal storage or phase change materials. Thermal management designs which use power to perform the thermal management increase the electrical energy storage device capacity that must be carried and can increase the heat generation problem even further.

The heat generated from the electrical energy storage device under load conditions typically influences the type and size of the cooling system required. The heat generation is due to both electrochemical enthalpy change as well as electrical resistive heating. The rate of discharge, and hence heat generated, depends on the chemistry type, construction, temperature, state of charge, and discharge or charge profile. Heat generation is temperature dependent and in general, more heat is generated at lower temperatures due to the increased resistance in the electrical energy storage device.

Prior art thermal management system designs include a number of physical interfaces with the electrical energy storage device. For example, in prior art designs, the electrical energy storage device may be surrounded by an isolation wrapping, a conductive bridge and an enclosure body to which a heat sink is attached. Each thermal interface boundary localizes a buildup of stored heat, resulting in disadvantageous reliability and performance issues.

Accordingly, there is a need for a thermally managed electrical energy storage device enclosure which minimizes thermal interface boundaries, such as for example, isolation wrapping, conductive bridges and heat sinks.

A need further exists for a thermally managed electrical energy storage device enclosure which exerts a uniform radial force on the electrical energy storage device or devices, thereby providing shock, vibration, and abrasion protection and thermal conductivity.

A need further exists for a thermally managed electrical energy storage device enclosure wherein the structure of the enclosure acts as a thermal management system which provides enhanced thermal conductivity, low overall manufacturing cost, weight reduction and volume reduction.

SUMMARY OF THE INVENTION

A thermally managed electrical energy storage device enclosure is provided. The enclosure includes a monocoque body formed from a plastic material using a single batch process and at least one void defined by a circumferential inner wall of the monocoque body. The void is adapted to receive at least one electrical energy storage device with a compression interference fit between an entire outer circumferential surface of the electrical energy storage device and the circumferential inner wall defining the void. The circumferential inner wall exerts a uniform radial force on the electrical energy storage device received therein.

In another aspect, the plastic material is a thermally conductive plastic material.

In another aspect, the enclosure includes a plurality of voids and the voids may be arranged symmetrically around a center of the monocoque body.

In another aspect, the void or voids may have a cylindrical shape.

In another aspect, the entire outer circumferential surface of the electrical energy storage device is in direct contact with the circumferential inner wall defining the associated void.

In another aspect, a passageway extends through the monocoque body. An electrical signal conductor and/or a power conductor may be routed through the passageway and a retention rod may be disposed within the passageway.

In another aspect, the monocoque body is a substantially rectangular body, a plurality of voids are arranged in an array and an integral control box is provided at an end of the substantially rectangular body.

In another aspect, the enclosure includes an access cover including an access plate covering the integral control box and a finned panel covering the array of voids.

In another aspect, an auxiliary cooling system is provided. The auxiliary cooling system may be a liquid cooling system and/or an air cooling system.

A method of forming a thermally managed electrical energy storage device module is provided. The method includes the steps of fabricating a monocoque body enclosure from a plastic material using a single batch process. The monocoque body enclosure has least one void defined by a circumferential inner wall of the monocoque body enclosure. The method further includes the step of inserting an electrical energy storage device into the void with a compression interference fit between an entire outer circumferential surface of the electrical energy storage device and the circumferential inner wall defining the associated void. The circumferential inner wall exerts a uniform radial force on the electrical energy storage device received therein.

In another aspect, during the step of inserting the electrical energy storage device into the at least one void, the electrical energy storage device is provided at a first temperature and the monocoque body enclosure is provided at a second temperature which is different from the first temperature.

In another aspect, the enclosure is formed with a plurality of voids and the method includes the step of symmetrically arranging the voids around a center of the monocoque body enclosure.

In another aspect, the method includes the step of directly contacting an entire outer circumferential surface of the electrical energy storage device with the circumferential inner wall defining the at least one void.

In another aspect, the step of fabricating a monocoque body enclosure further includes the step of forming a passageway extending through the monocoque body enclosure.

In another aspect, the method includes the step of routing at least one of an electrical signal conductor and a power conductor through the passageway.

In another aspect, the method includes the step of inserting a retention rod through the passageway.

An apparatus and method according to aspects of the invention provide a thermally managed enclosure for cylindrical type electrical energy storage devices for use in mobile and stationary applications where shock, vibration, and storage device protection are required. The invention can be used for electrochemical (batteries or cells) or capacitive-type energy storage systems.

An advantage of an apparatus and method according to aspects of the invention is that the enclosure facilitates the elimination of the typical isolative wrapping on the electrical energy storage device to enhance thermal conductivity and maintain electrical isolation.

Another advantage of an apparatus and method according to aspects of the invention is that the enclosure exerts a uniform radial force on the electrical energy storage device to provide shock, vibration, and abrasion protection and thermal conductivity.

Another advantage of an apparatus and method according to aspects of the invention is that the structure of the enclosure also acts as a thermal management system which provides enhanced thermal conductivity, low overall manufacturing cost, weight reduction and volume reduction.

BRIEF DESCRIPTION OF THE DRAWINGS

Other benefits and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE DRAWINGS

Figure 5:
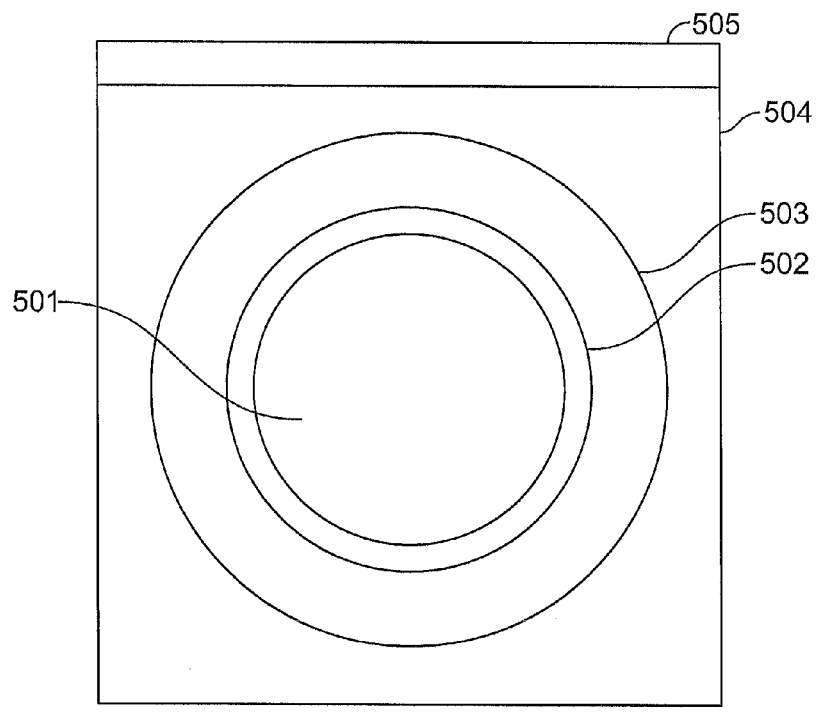
FIG. 5 shows a prior art battery interface.

To better appreciate the present invention, some deficiencies with respect to the prior art are illustrated in FIG. 5. In particular, prior art battery enclosure designs include a number of physical interfaces associated with their construction. As shown in FIG. 5, the electrical energy storage device (e.g. cell) itself 501 is surrounded by an isolation wrapping 502, a conductive bridge 503, an enclosure body 504, and then a heat sink 505 is attached. Each interface boundary localizes a buildup of stored heat which has disadvantageous reliability and performance issues.

The elimination of the isolation wrapping 502 and the conductive bridge 503 would eliminate four thermal interfaces in the construction of the enclosure module.

Figure 1:
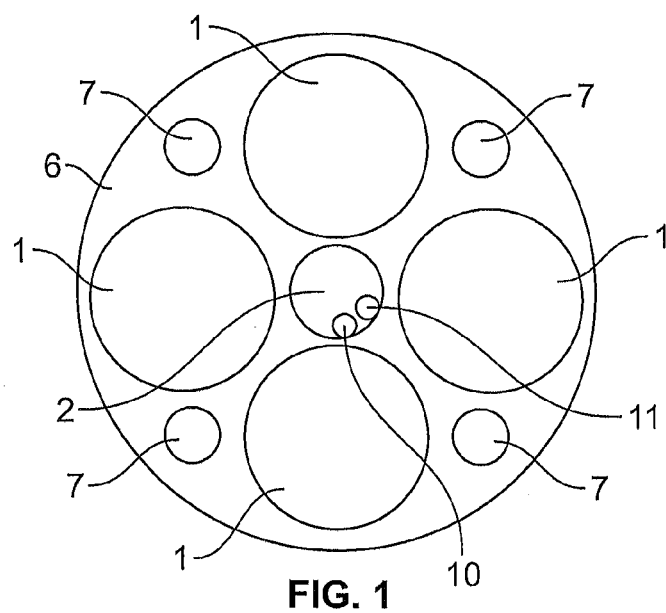
FIG. 1 shows a top view of a thermally managed electrical energy storage device enclosure according to an embodiment of the invention.

FIG. 1 shows a top view of thermally managed electrical energy storage device enclosure according to an embodiment of the invention. The enclosure includes a monocoque body 6 formed from a plastic material using a single batch process. The single batch process may be for example, an injection molding process. The plastic material may be a thermally conductive plastic material. The use of a monocoque single batch process (such as injection molding) results in a unitized structure with no internal thermal or structural disconnects.

One or more voids or cavities 1 are provided in the body 6. The void or voids are defined by respective circumferential inner walls of body 6. The void or voids are adapted to receive at least one electrical energy storage device 3 with a compression interference fit between an entire outer circumferential surface of the electrical energy storage device 3 and the circumferential inner wall defining the associated void 1. Electrical energy storage device 3 may be an electrochemical electrical energy storage device (such as, for example, a battery or cell) and/or a capacitive-type energy storage device (such as, for example, an ultracapacitor).

The circumferential inner wall defining the void 1 exerts a uniform radial force on the electrical energy storage device 3 received therein. This uniform radial force emanates from the use of a compression interference fit between the electrical energy storage device 3 and the respective void 1.

Figure 3:
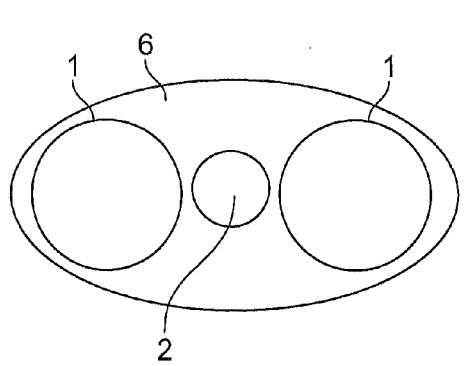
FIG. 3 shows a top view of thermally managed electrical energy storage device enclosure according to a further embodiment of the invention.
Figure 4:
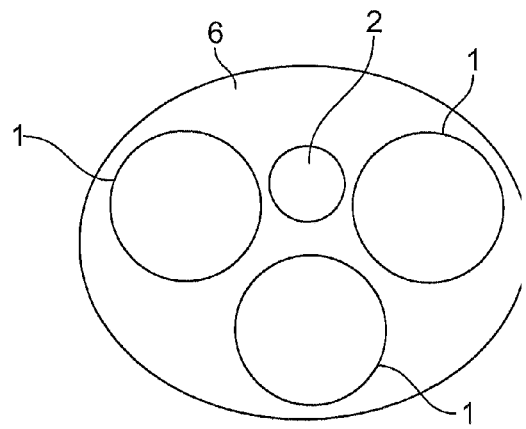
FIG. 4 shows a top view of thermally managed electrical energy storage device enclosure according to a further embodiment of the invention.

As shown in FIGS. 1, 3 and 4, a plurality of voids or cavities 1 may be arranged symmetrically around the center of the monocoque body 6. For example, as shown, two, three, four or more voids 1 may be provided in a single body 6. The monocoque body 6 is a single thermal body may have a circular or elliptical shape or any suitable shape which achieves the desired thermal balancing of the system. Body 6 provides a unitized device that serves as the structure of enclosure and the primary thermal conduction device for the electrical energy storage devices associated therewith.

As shown, the void or voids 1 may have a cylindrical shape to facilitate the compression interference fit with an electrical energy storage device having a similar cylindrical shape. Other shapes of the voids to correspond to various electrical energy storage device configurations are contemplated as well.

As set forth above, with the elimination of the multiple interfaces present in prior art devices, and the use of the unified single batch monocoque process, a electrical energy storage device enclosure according to aspects of the invention provides a single thermal body with only two interfaces, thereby improving reliability and performance. Preferably, the entire outer circumferential surface of the electrical energy storage device 3 is in direct contact with the circumferential inner wall defining the associated void 1.

Figure 2:
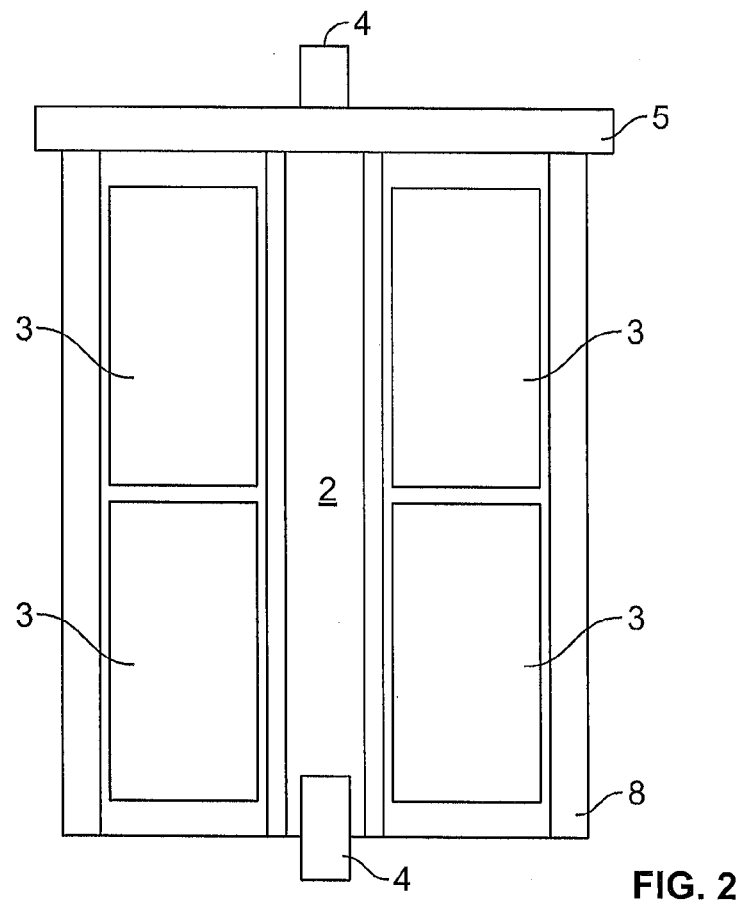
FIG. 2 shows a side view of thermally managed electrical energy storage device enclosure according to a further embodiment of the invention.

A passageway 2 may extend through the monocoque body 6. The passageway 2 may be in the form of a void or channel which allows for electric signal 10 or power conductors 11 to be routed therethrough and also allows for the passage of a retention rod 4. FIG. 1 illustrates an electrical signal conductor 10 and a power conductor 11 routed through the passageway 2. FIG. 2 illustrates a retention rod 4 disposed within the passageway.

Individual unitized enclosures can contain a single or plurality of electrical energy storage devices and can be stacked with other similar enclosures via interlocking and piloting features to form an array of electrical energy storage devices at a desired working voltage or capacity. For example, body 6 may interlock with other similar bodies 6 using male 8 and female 5 piloting surface elements, as shown in FIG. 2. Covers may be used to terminate the end of an enclosure module to protect it from the environment when no additional enclosure modules are coupled together.

Figure 6:
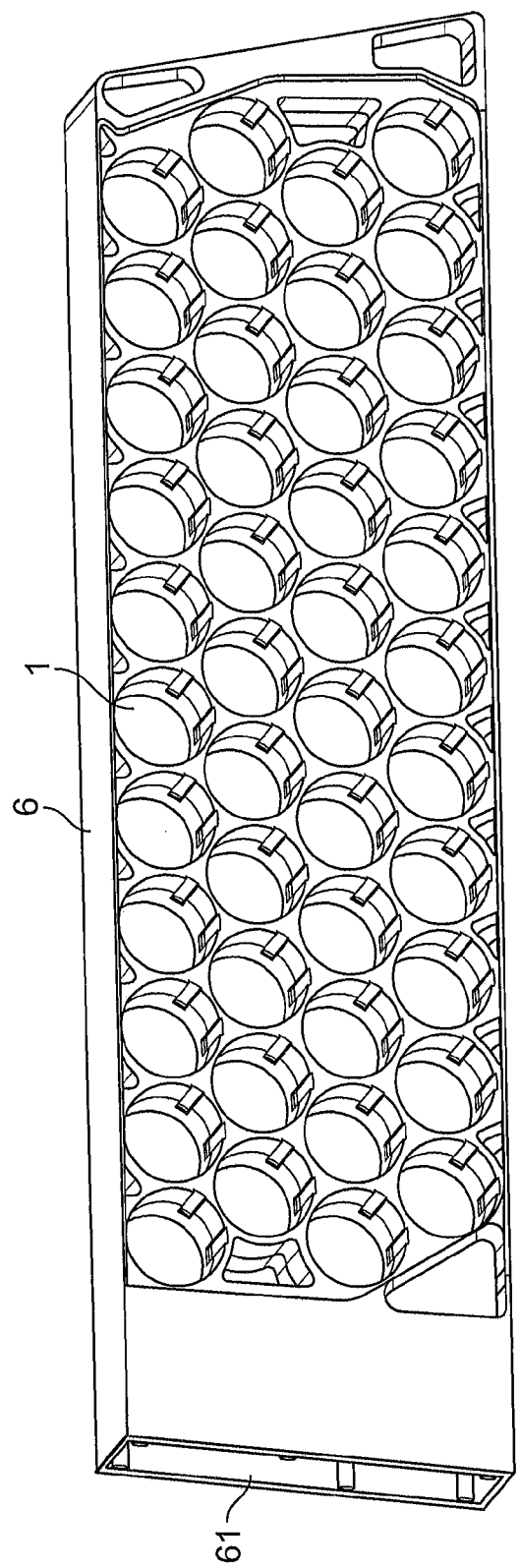
FIG. 6 shows a perspective view of thermally managed electrical energy storage device enclosure according to a further embodiment of the invention.
Figure 7:
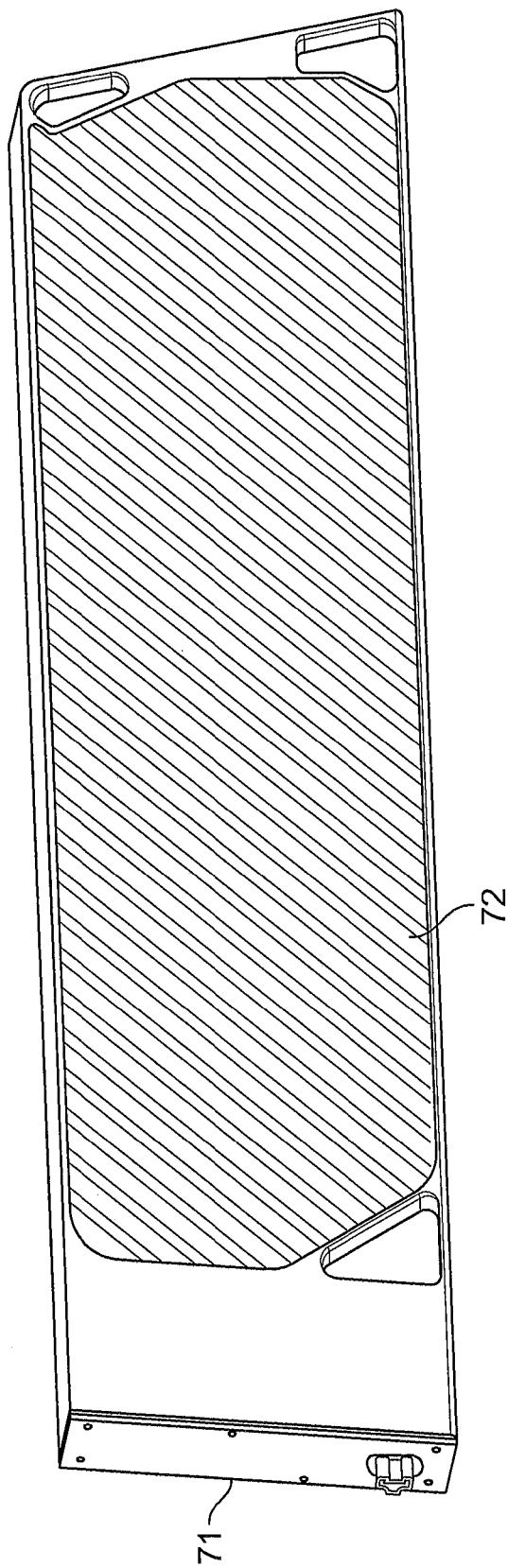
FIG. 7 shows a perspective view of the thermally managed electrical energy storage device enclosure of FIG. 6 with an access plate and a finned panel.

FIGS. 6 and 7 show further embodiments, wherein monocoque body 6 is a substantially rectangular body. A plurality of voids or cavities 1 for receiving the electrical energy storage devices are arranged in an array. For example, in the exemplary enclosure shown, forty-four electrical energy storage devises, which may be in the form of ultracapacitors, may be arranged in a single core plastic enclosure. An integral control box 61 is provided at an end of the substantially rectangular body. Integral control box 61 may be situated on the left side of the enclosure as shown and may duplicate the functionality of the wire way passage shown in the other embodiments. An access cover may be provided which includes an access plate 71 covering the integral control box 61 and a finned panel 72 covering the array of voids 1. This access cover can provide access to the control box 61 and to the encapsulated electrical energy storage devices.

The structure of the enclosure can be used as a passive device for thermal management or coupled with active convective or conductive cooling methods such as forced air or liquid cooling. For example as shown in FIG. 1, a auxiliary liquid cooling system and/or an auxiliary air cooling system may be provided in order to supplement to the passive cooling functionality of the enclosure itself. As illustrated in FIG. 1, the auxiliary liquid and or air cooling system may include channels 7 extending through enclosure body 6. Channels 7 may be cylindrical in shape and may have a cooling liquid and/or a cooling gas (such as air) forced through the channel to augment the cooling functionality of the enclosure body.

A method of forming a thermally managed electrical energy storage device module according to an aspect of the invention includes the steps of fabricating a monocoque body enclosure 6 from a plastic material using a single batch process. The monocoque body enclosure 6 has least one void 1 defined by a circumferential inner wall of the monocoque body enclosure 6. The method further includes the step of inserting an electrical energy storage device 3 into the void 1 with a compression interference fit between an entire outer circumferential surface of the electrical energy storage device 3 and the circumferential inner wall defining the associated void 1. The circumferential inner wall exerts a uniform radial force on the electrical energy storage device 3 received therein.

The module is assembled by using compression, interference fit that can incorporate the use of dissimilar temperatures at the time of assembly, resulting in a completed system that approximates the thermal characteristics of a single and uniform mass. Accordingly, during the step of inserting an electrical energy storage device 3 into a void 1, the electrical energy storage device 3 may be provided or maintained at a first temperature and the monocoque body 6 enclosure may be provided or maintained at a second temperature which is different from the first temperature. This yields features for electrical energy storage device containment and compression to facilitate efficient heat dissipation of the electrical energy storage device to outdoor environments and thermal balancing between electrical energy storage devices. The compression interference fit creates a uniform radial force also resulting in beneficial internal electrode and separator alignment which maintains uniform operating voltage throughout the usable life of the electrical energy storage device.

The enclosure may be formed with a plurality of voids 1 and the voids 1 may be symmetrically arranged around a center of the monocoque body enclosure. The method may also include the step of directly contacting an entire outer circumferential surface of the electrical energy storage device 3 with the circumferential inner wall defining the respective void 1. A passageway 2 extending through the monocoque body enclosure may be provided and an electrical signal conductor 10 and/or a power conductor 11 may be routed through the passageway 2. In addition, a retention rod 4 may be inserted through the passageway 2.

In the foregoing description, certain terms and visual depictions are used to illustrate preferred embodiments. However, no unnecessary limitations are to be construed by the terms used or illustrations depicted, beyond what is shown in the prior art, since the terms and illustrations are exemplary only, and are not meant to limit the scope of the present invention.

Accordingly, while several embodiments of the present invention have been shown and described, it is obvious that many changes and modifications may be made thereunto without departing from the spirit and scope of the invention.

What is claimed is:

1. A thermally managed electrical energy storage device enclosure comprising:
    a monocoque body formed from a thermally conductive plastic material using a single batch process; and
    at least one void defined by a circumferential inner wall of said monocoque body;
    said at least one void adapted to receive at least one electrical energy storage device with a compression interference fit between an entire outer circumferential surface of the electrical energy storage device and said circumferential inner wall defining said at least one void;
    wherein said circumferential inner wall exerts a uniform radial force on the electrical energy storage device received therein.

2. The thermally managed electrical energy storage device enclosure according to claim 1, wherein said at least one void comprises a plurality of voids.

3. The thermally managed electrical energy storage device enclosure according to claim 2, wherein said plurality of voids are arranged symmetrically around a center of said monocoque body.

4. The thermally managed electrical energy storage device enclosure according to claim 1, wherein said at least one void has a cylindrical shape.

5. The thermally managed electrical energy storage device enclosure according to claim 1, wherein said entire outer circumferential surface of the electrical energy storage device is in direct contact with said circumferential inner wall defining said at least one void.

6. The thermally managed electrical energy storage device enclosure according to claim 1, further comprising a passageway extending through said monocoque body.

7. The thermally managed electrical energy storage device enclosure according to claim 6, further comprising at least one of an electrical signal conductor and a power conductor routed through said passageway.

8. The thermally managed electrical energy storage device enclosure according to claim 6, further comprising a retention rod disposed within said passageway.

9. The thermally managed electrical energy storage device enclosure according to claim 1, wherein said monocoque body comprises a substantially rectangular body, said at least one void comprises a plurality of voids arranged in an array and an integral control box is provided at an end of said substantially rectangular body.

10. The thermally managed electrical energy storage device enclosure according to claim 9, further comprising an access cover comprising an access plate covering said integral control box and a finned panel covering said array of voids.

11. The thermally managed electrical energy storage device enclosure according to claim 1, further comprising an auxiliary cooling system, said auxiliary cooling system comprising at least one of a liquid cooling system and an air cooling system.

12. A method of forming a thermally managed electrical energy storage device module, the method comprising the steps of:
    a) fabricating a monocoque body enclosure from a thermally conductive plastic material using a single batch process, the monocoque body enclosure having least one void defined by a circumferential inner wall of the monocoque body enclosure; and
    b) inserting an electrical energy storage device into the at least one void with a compression interference fit between an entire outer circumferential surface of the electrical energy storage device and the circumferential inner wall defining the at least one void;
    wherein the circumferential inner wall exerts a uniform radial force on the electrical energy storage device received therein.

13. The method of forming a thermally managed electrical energy storage device module according to claim 12, wherein during the step of inserting the electrical energy storage device into the at least one void, the electrical energy storage device is provided at a first temperature and the monocoque body enclosure is provided at a second temperature which is different from the first temperature.

14. The method of forming a thermally managed electrical energy storage device module according to claim 12, wherein the at least one void comprises a plurality of voids.

15. The method of forming a thermally managed electrical energy storage device module according to claim 14, further comprising the step of arranging the plurality of voids symmetrically around a center of the monocoque body enclosure.

16. The method of forming a thermally managed electrical energy storage device module according to claim 12, further comprising the step of directly contacting an entire outer circumferential surface of the electrical energy storage device with the circumferential inner wall defining the at least one void.

17. The method of forming a thermally managed electrical energy storage device module according to claim 12, wherein the step of fabricating a monocoque body enclosure further comprises forming a passageway extending through the monocoque body enclosure.

18. The method of forming a thermally managed electrical energy storage device module according to claim 17, further comprising the step of routing at least one of an electrical signal conductor and a power conductor through the passageway.

19. The method of forming a thermally managed electrical energy storage device module according to claim 17, further comprising the step of inserting a retention rod through the passageway.

* * * * *